(12) United States Patent
Dix et al.

(10) Patent No.: US 11,472,395 B2
(45) Date of Patent: Oct. 18, 2022

(54) SYSTEM AND METHOD FOR EXECUTING MULTI-MODE TURNS WITH A WORK VEHICLE

(71) Applicant: CNH Industrial America LLC, New Holland, PA (US)

(72) Inventors: Phillip Duane Dix, Westmont, IL (US); Daniel Geiyer, Bolingbrook, IL (US); Aditya Singh, Bolingbrook, IL (US); Navneet Gulati, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 308 days.

(21) Appl. No.: 16/804,993

(22) Filed: Feb. 28, 2020

(65) Prior Publication Data

US 2021/0271255 A1   Sep. 2, 2021

(51) Int. Cl.
  *G05D 1/02*   (2020.01)
  *B60W 10/18*   (2012.01)
  (Continued)

(52) U.S. Cl.
  CPC .......... *B60W 10/188* (2013.01); *B60W 10/20* (2013.01); *B60W 30/045* (2013.01);
  (Continued)

(58) Field of Classification Search
  CPC .. B60W 10/18; B60W 10/184; B60W 10/192; B60W 10/198; B60W 2300/154;
  (Continued)

(56) References Cited

U.S. PATENT DOCUMENTS 5,850,616 A * 12/1998 Matsuno ................. B60T 8/175
                                                           701/84
6,021,367 A *  2/2000 Pilutti ..................... B60T 8/246
                                                          303/146
(Continued)

FOREIGN PATENT DOCUMENTS

CN   102923188 A  *  2/2013  ............ B62D 5/065
CN   202923708 U  *  5/2013
(Continued)

*Primary Examiner* — B M M Hannan
(74) *Attorney, Agent, or Firm* — Rickard K. DeMille; Rebecca L. Henkel (57) ABSTRACT

A method for executing multi-mode turns with a work vehicle includes transmitting initial steering and braking commands for controlling an operation of a steering actuator(s) and a steering brake(s), respectively, of the work vehicle to initiate execution of a multi-mode turning operation. The method also includes determining allowable steering and braking rates for the work vehicle based at least in part on an actual steering rate and an actual braking rate, respectively, of the work vehicle during execution of the multi-mode turning operation, and determining updated steering and braking commands based at least in part on the allowable steering and braking rates. In addition, the method includes transmitting the updated steering and braking commands to control the operation of the steering actuator(s) and the steering brake(s), respectively, to continue execution of the multi-mode turning operation.

20 Claims, 5 Drawing Sheets

(51) Int. Cl.
*B60W 10/20* (2006.01)
*B60W 30/10* (2006.01)
*B60W 10/188* (2012.01)
*B60W 30/045* (2012.01)

(52) U.S. Cl.
CPC ... *B60W 2300/152* (2013.01); *B60W 2510/18* (2013.01); *B60W 2510/205* (2013.01); *B60W 2710/18* (2013.01); *B60W 2710/20* (2013.01)

(58) Field of Classification Search
CPC ....... B60W 2300/156; B60W 2300/18; B60W 2300/185; B60W 2510/20; B60W 10/188; B60W 10/20; B60W 30/045; B60W 2300/152; B60W 2510/18; B60W 2510/205; B60W 2710/18; B60W 2710/20; B60W 60/001; B60W 2520/10; B62D 11/003; B62D 11/08; B62D 11/24
USPC ........................................................ 701/41
See application file for complete search history.

(56) References Cited

U.S. PATENT DOCUMENTS

| | | | |
|---|---|---|---|
| 6,141,613 A | 10/2000 | Fan | |
| 6,275,762 B1* | 8/2001 | Salg | B60K 23/08 701/84 |
| 6,311,634 B1* | 11/2001 | Ford | B63H 25/04 114/144 R |
| 6,925,380 B1* | 8/2005 | Harrison, Jr. | A01B 69/008 701/410 |
| 7,216,026 B2 | 5/2007 | Heuer | |
| 7,318,629 B1* | 1/2008 | Sun | B60W 10/11 701/41 |
| 7,894,958 B2* | 2/2011 | Tate | B60T 8/175 701/44 |
| 8,616,659 B2 | 12/2013 | Nordhoff | |
| 9,050,890 B2 | 6/2015 | Buerkle et al. | |
| 9,637,098 B2 | 5/2017 | Schick | |
| 10,321,622 B2 | 6/2019 | Muemken et al. | |
| 2002/0060103 A1* | 5/2002 | Ritz | B62D 9/00 180/233 |
| 2005/0206224 A1* | 9/2005 | Lu | B60T 8/246 303/7 |
| 2005/0206225 A1* | 9/2005 | Offerle | B60T 8/246 303/7 |
| 2005/0236894 A1* | 10/2005 | Lu | B62D 11/08 303/139 |
| 2005/0288834 A1* | 12/2005 | Heiniger | G05D 1/0278 701/50 |
| 2009/0204292 A1* | 8/2009 | Tate | B60T 8/175 701/41 |
| 2012/0283907 A1* | 11/2012 | Lee | B60T 8/17557 701/32.9 |
| 2014/0358340 A1* | 12/2014 | Radev | B60W 10/26 180/65.265 |
| 2015/0012158 A1* | 1/2015 | Makino | B60K 1/02 701/22 |
| 2016/0023526 A1* | 1/2016 | Lavoie | B62D 15/027 701/41 |
| 2016/0214645 A1* | 7/2016 | Owen | B60T 8/17552 |
| 2016/0257341 A1* | 9/2016 | Lavoie | B60W 30/18036 |
| 2017/0106865 A1* | 4/2017 | Lavoie | B62D 13/06 |
| 2018/0314252 A1* | 11/2018 | Asakura | G01C 21/3629 |
| 2019/0031191 A1* | 1/2019 | Satoh | B60W 30/18145 |
| 2019/0047620 A1 | 2/2019 | Iwamura | |
| 2019/0054916 A1 | 2/2019 | Akiyama et al. | |
| 2019/0176812 A1* | 6/2019 | Hirata | B60W 30/045 |
| 2019/0344823 A1* | 11/2019 | Miyajima | B62D 6/002 |
| 2020/0339140 A1* | 10/2020 | Lin | B60W 10/04 |

FOREIGN PATENT DOCUMENTS

| | | | | |
|---|---|---|---|---|
| CN | 102649448 B | | 7/2014 | |
| CN | 110843908 A | * | 2/2020 | ............... B62D 7/02 |
| DE | 10029819 C1 | | 5/2002 | |
| DE | 102015221120 A | | 5/2016 | |
| EP | 2767455 A2 | | 8/2014 | |
| EP | 3489100 A2 | | 5/2019 | |
| JP | 2007020443 A | | 2/2007 | |
| KR | 101083214 B1 | | 11/2011 | |

* cited by examiner

SYSTEM AND METHOD FOR EXECUTING MULTI-MODE TURNS WITH A WORK VEHICLE

FIELD OF THE INVENTION

The present disclosure generally relates to work vehicles, such as agricultural vehicles configured to tow or be coupled to an implement, and, more particularly, to systems and methods for executing multi-mode turns with a work vehicle during which a combination of both steering and braking is used to perform the associated turning operation.

BACKGROUND OF THE INVENTION

Work vehicles, such as agricultural tractors, often include an auto-guidance system for automatically guiding the vehicle along a predetermined path. For instance, a controller of the work vehicle may receive location data from an associated positioning device, such as a satellite navigation position system or a local position detection system, associated with the relative location of the work vehicle within the field. Based on such location feedback, the controller may then automatically control the vehicle's steering system to maintain the work vehicle in alignment with the desired path. However, the steering system often presents limitations when executing turns along the desired path of the work vehicle. For instance, the steering system has a maximum turning radius based on the speed of the work vehicle that serves to restrict the radius of curvature along which the work vehicle can be guided. Moreover, certain operating conditions/parameters of the work vehicle may also serve to limit the ability of the steering system to effectively steer the vehicle along a curved path of given radius.

Accordingly, an improved system and method for executing turns with a work vehicle that allows a combination of both steering and braking to be used for achieving a desired turning operation would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for executing multi-mode turns with a work vehicle, wherein the work vehicle includes a plurality of traction devices, at least one steering actuator configured to actuate a first pair of traction devices of the plurality of traction devices to adjust a steering angle of the work vehicle, and at least one steering brake configured to selectively brake at least one traction device of the plurality of traction devices. The method includes transmitting, with one or more computing devices, initial steering and braking commands for controlling an operation of the steering actuator(s) and the steering brake(s), respectively, to initiate execution of a multi-mode turning operation, the initial steering and braking commands being associated with desired steering and braking rates, respectively, for the multi-mode turning operation. The method also includes determining, with the one or more computing devices, allowable steering and braking rates for the work vehicle based at least in part on an actual steering rate and an actual braking rate, respectively, of the work vehicle during execution of the multi-mode turning operation, and determining, with the one or more computing devices, updated steering and braking commands based at least in part on the allowable steering and braking rates. In addition, the method includes transmitting, with the one or more computing devices, the updated steering and braking commands to control the operation of the steering actuator(s) and the steering brake(s), respectively, to continue execution of the multi-mode turning operation.

In another aspect, the present subject matter is directed to a system for executing multi-mode turns with a work vehicle. The system comprises a plurality of traction devices including a first pair of traction devices and a second pair of traction devices. The system also includes a steering assembly having at least one steering actuator configured to actuate the first pair of traction devices to adjust a steering angle of the work vehicle, and a braking assembly having at least one steering brake configured to selectively brake at least one traction device of the plurality of traction devices. In addition, the system includes a controller having at least one processor and associated memory, the memory storing instructions that, when executed by the at least one processor, configure the controller to transmit initial steering and braking commands for controlling an operation of the steering actuator(s) and the steering brake(s), respectively, to initiate execution of a multi-mode turning operation, with the initial steering and braking commands being associated with desired steering and braking rates, respectively, for the multi-mode turning operation. The controller is also configured to determine allowable steering and braking rates for the work vehicle based at least in part on an actual steering rate and an actual braking rate, respectively, of the work vehicle during execution of the multi-mode turning operation, and determine updated steering and braking commands based at least in part on the allowable steering and braking rates. Moreover, the controller is configured to transmit the updated steering and braking commands to control the operation of the steering actuator(s) and the steering brake(s), respectively, to continue execution of the multi-mode turning operation.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for executing multi-mode turns within a work vehicle. Specifically, in several embodiments, the disclosed system and method allow for multi-mode turns to be executed in which a combination of both steering and braking is used to achieve a desired turn. For example, prior to initiating a turning operation, a controller of the work vehicle may be configured to break down the upcoming turn into two components, namely the amount of correction that can be achieved via control of the vehicle's steering assembly and the amount of correction that can be achieved via control of the vehicle's braking assembly. By analyzing such components, the controller may be configured to determine the optimal ratio of steering/braking for executing the desired turning operation. The controller may then transmit corresponding steering/braking commands for automatically controlling the operation of the vehicle's steering and braking assemblies to facilitate execution of the desired turn.

In several embodiments, the steering/braking commands transmitted by the controller may be determined using a predetermined multi-mode turning function, such as a cost function in which various system constraints are input as weighted variables to identify the appropriate steering/braking commands that minimize the function. For example, an instantaneous or current achievable/allowable steering rate and braking rate may be used as inputs into the cost function, such as by inputting the instantaneous or current maximum allowable steering and braking rates into the cost function. In addition, various other system parameters or constraints, such as the ground speed of the work vehicle, the maximum allowable braking duration for the steering brakes, one or more operating parameters of the vehicle's hydraulic system, an operator-selected aggressiveness setting, and/or an implement-related parameter (e.g., whether the vehicle is towing an implement, and if so, whether the implement is drawn implement or an implement coupled to the vehicle via a three-point hitch), may be input as weighted variables into the cost function. By taking into account the relevant variables within the cost function, the optimal steering/braking commands for executing the desired turning operation can be determined. Moreover, the controller may also be configured to continuously update the constraints/parameters input into the cost function, thereby allowing the controller to instantaneously adjust the braking/steering commands during execution of a turning operation to ensure that the vehicle is turned in the most efficient and effective manner.

Figure 1:
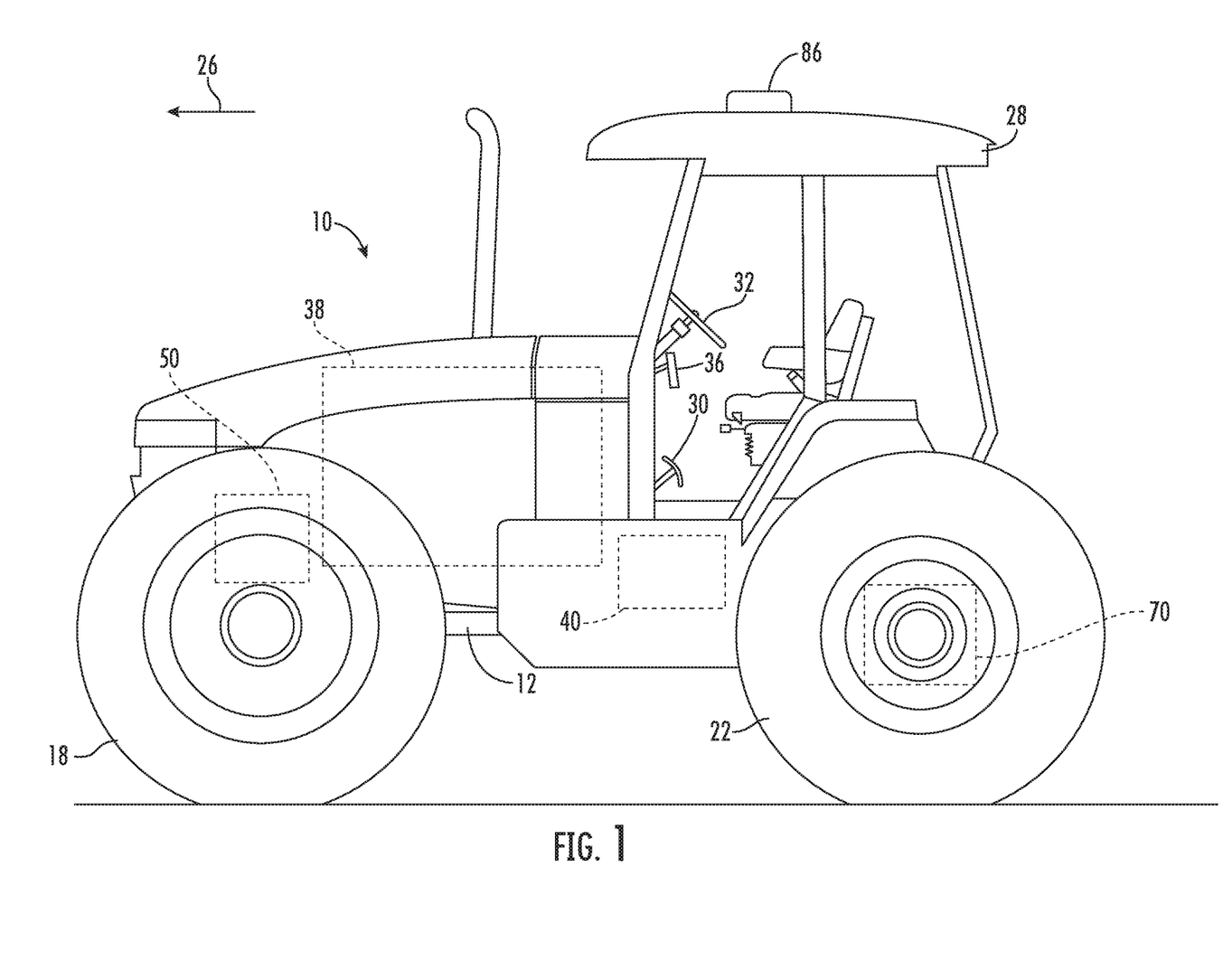
FIG. 1 illustrates a side view of one embodiment of a work vehicle in accordance with aspects of the present subject matter.
Figure 2:
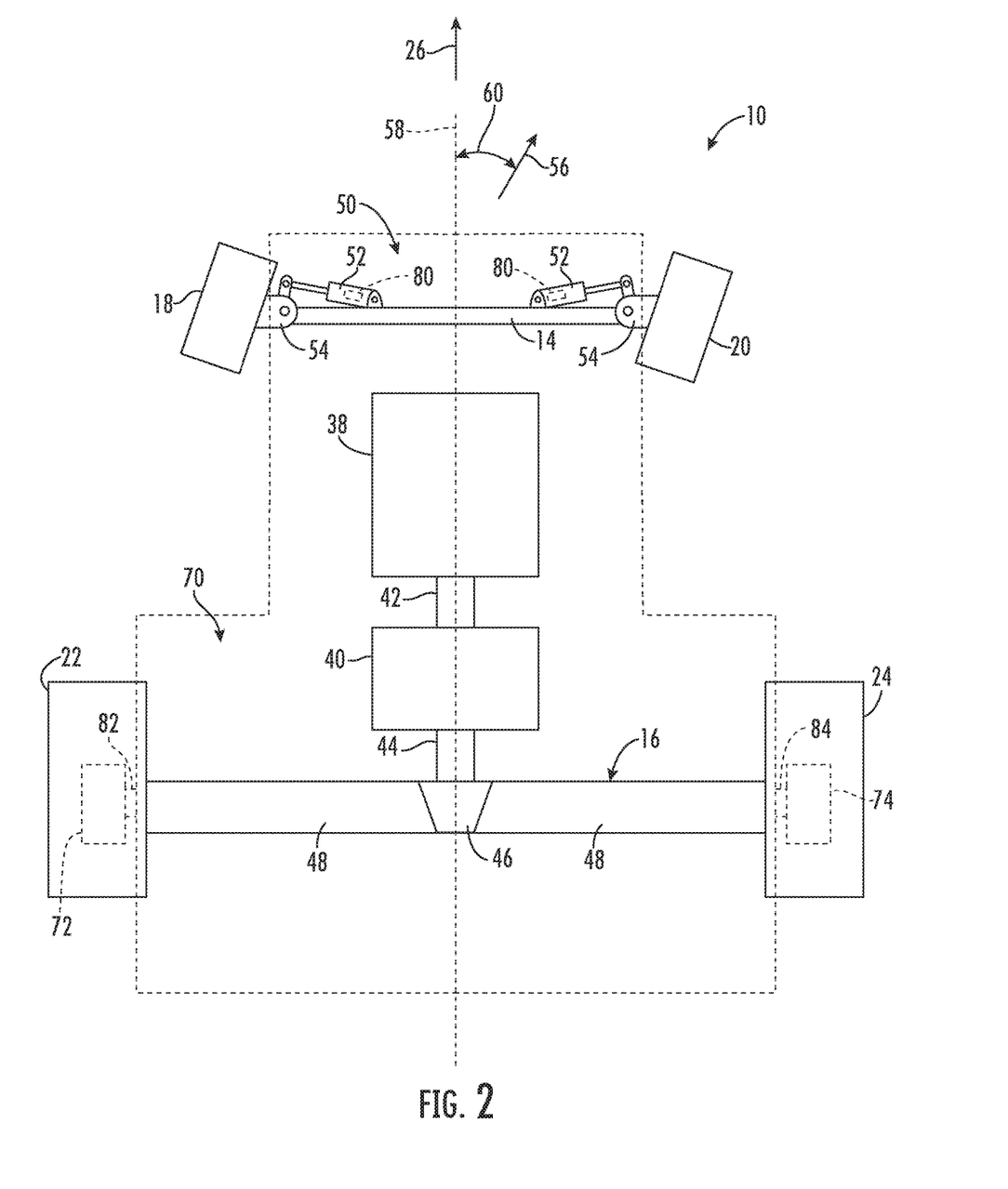
FIG. 2 illustrates a schematic, top view of the work vehicle shown in FIG. 1 in accordance with aspects of the present subject matter.

Referring now to the drawings, FIGS. 1 and 2 illustrate differing views of one embodiment of a work vehicle 10 in accordance with aspects of the present subject matter. Specifically, FIG. 1 illustrates a side view of the work vehicle 10, and FIG. 2 illustrates a schematic, top view of the work vehicle 10, particularly illustrating various components of the vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

The work vehicle 10 may include a frame or chassis 12 (FIG. 1) configured to support or couple to a plurality of components. As shown in FIG. 2, front and rear axles 14, 16 may be supported relative to the chassis 12, with each axle 14, 16 having a pair of traction devices coupled thereto for engaging the ground. In the illustrated embodiment, the traction devices correspond to wheels, namely a pair of steerable front wheels 18, 20 and a pair of driven rear wheels 22, 24. In an alternative embodiment, the front wheels 18, 20 may be driven in addition to the rear wheels 22, 24. Regardless, the wheels 18, 20, 22, 24 may be configured to support the work vehicle 10 relative to the ground to allow the vehicle 10 to be moved in a direction of travel (e.g., as indicated by arrow 26 in FIGS. 1 and 2) across a field.

It should be appreciated that, as used herein, the term "wheel" is used broadly and is intended to cover various embodiments of rolling support devices, including a wheel with or without a tire provided in associated therewith. For example, in several embodiments, the term "wheel" may correspond to a wheel configured to directly contact or engage the driving surface around its outer perimeter or the term "wheel" may correspond to a wheel configured to contact or engage the driving surface via a tire or suitable inflatable member installed around its outer perimeter. It should also be appreciated that, in other embodiments, the traction devices may correspond to track assemblies or any other suitable traction devices.

Additionally, an operator's cab 28 (FIG. 1) may be supported by a portion of the chassis 12 and may house various control or input devices 30, 32, 34 (e.g., levers, pedals, control panels, buttons and/or the like) for permitting an operator to control the operation of the work vehicle 10. For instance, as shown in FIG. 1, the work vehicle 10 may include an actuatable pedal 30, such as a brake pedal 30 for manually actuating the vehicle's brakes, and a steering wheel 32 for permitting an operator to manually steer the work vehicle 10. In addition, the work vehicle 10 may include a control panel 36 (FIG. 1) within the cab 28 for displaying message windows and/or alerts to the operator and/or for allowing the operator to interface with the vehicle's controller. For instance, in one embodiment, the control panel 36 may include buttons, knobs and/or any other suitable input devices that allow the operator to provide user inputs to the controller, such as by allowing the operator to provide an input instructing the controller to operate the work vehicle 10 in an auto-guidance mode in which the controller automatically guides the work vehicle across the field along a predetermined path (including the automatic execution of turns or turning operations along such path).

Moreover, as shown, the work vehicle 10 may include an engine 38 and a transmission 40 configured to be mounted on the chassis 12 of the work vehicle 10. The transmission 40 may be operably coupled to the engine 38 via one or more shafts 42 (FIG. 2) and may be configured to provide variably adjusted gear ratios for transferring engine power to the driven wheels 22, 24 via the rear axle 16. For example, as shown in FIG. 2, an output shaft 44 of the transmission 40 may be coupled to a differential 46, which, in turn, is coupled to one or more axle shafts 48 forming the rear axle 18 for transferring power to the driven wheels 22, 24.

Referring still to FIGS. 1 and 2, in several embodiments, the work vehicle 10 may also include a steering assembly 50 for adjusting the direction of travel 26 of the work vehicle 10. As shown in FIG. 2, the steering assembly 50 may include one or more steering actuators 52 coupled to the steerable wheels 20, 22 (e.g., via steering knuckles 54). As a result, extension and/or retraction of the steering actuators 52 results in the orientation or steering direction 56 (FIG. 2) of the steerable wheels 20, 22 being adjusted relative to the chassis 12, thereby varying the direction of travel 26 of the vehicle 10. Specifically, the steering actuators 52 may be configured to pivot or otherwise rotate the steerable wheels 20, 22 relative to the chassis 12 about the steering knuckles 54 based on a received input (e.g., from the steering wheel 32 or control signals from the controller, such as when operating within an auto-guidance mode) in a manner that aligns the steering direction 56 of the wheels 20, 22 with the intended direction of travel of the vehicle 10. It should be appreciated that, as described herein, each steering actuator 52 is configured as a hydraulic actuator or cylinder. However, in other embodiments, each steering actuator 52 may correspond to an electric motor, a linear actuator, a pneumatic cylinder, or any other suitable actuator coupled to a suitable mechanical linkage or assembly, such as a rack and pinion or a worm gear assembly, for steering the steerable wheels 20, 22.

As an example, FIG. 2 illustrates the steerable wheels 20, 22 after such wheels have been pivoted to the right relative to a longitudinal axis (e.g., as indicated by dashed line 58 in FIG. 2) of the chassis 12. In such instance, the direction of travel 26 of the work vehicle 10 may similarly be oriented to the right, thereby causing the vehicle 10 to turn right. Furthermore, when the work vehicle 10 is being turned, a steering angle (e.g., as indicated by arrow 60 in FIG. 2) may be defined between the steering direction 56 of the wheels 20, 22 and the longitudinal axis 58 of the chassis 12. Increasing the steering angle 60 may generally decrease the turning radius of the work vehicle 10 (i.e., the turn is "sharper"). Conversely, decreasing the steering angle 60 may generally increase the turning radius of the work vehicle 10 (i.e., the turn is "wider"). It should be appreciated that, when the work vehicle 10 is turned, two of the wheels 18, 20, 22, 24 may correspond to inside wheels (i.e., relative to the direction of the turn) and the other two of the wheels 18, 20, 22, 24 may correspond to the outside wheels (i.e., relative to the direction of the turn). For example, as indicated above, the work vehicle 10 shown in FIG. 2 is being turned to the right. As such, wheels 20, 24 (i.e., the wheels on the right side of the vehicle 10) correspond to the inside wheels and the wheels 18, 22 (i.e., the wheels on the left side of the vehicle 10) correspond to the outside wheels. However, when the work vehicle 10 is turned to the left, the wheels 18, 22 on the left side of the vehicle 10 correspond to the inside wheels and the wheels 20, 24 on the right side of the vehicle 10 correspond to the outside wheels.

Moreover, the work vehicle 10 may include a braking assembly 70 for applying a braking force to one or more of the wheels 18, 20, 22, 24. In several embodiments, the braking assembly 70 may include one or more steering brakes 72, 74 provided in operative association with one or more respective wheels to apply a braking force thereto to helps facilitate the execution of turns or turning operations. For example, as shown in FIG. 2, first and second steering brakes 72, 74 are provided in operative association with the left and right driven wheels 22, 24 respectively. In this regard, the first steering brake 72, when activated, may be configured to reduce the wheel speed of or otherwise slow the rotation of the associated wheel 22. Similarly, the second steering brake 74, when activated, may be configured to reduce the wheel speed of or otherwise slow the rotation of the associated wheel 24. As will be described below, the steering brakes 72, 74 of the steering assembly 70 may be configured for independent activation. That is, each of the steering brakes 72, 74 may be activated without also activating the other steering brake. As a result, when a turn is being executed, the steering brake 72, 74 associated with the inside wheel (e.g., the left or right driven wheel 22, 24 when turning left or right, respectively) may be activated independently to provide braking at such inside wheel in a manner that facilitates or assists in the execution of the turn. It should be appreciated that, in alternative embodiments, the steering assembly 70 may also include additional steering brakes, such as an individual steering brake provided in association with each steerable wheel 18, 20. It should also be appreciated that, in addition to the steering brakes 72, 74, the braking assembly 70 of the work vehicle 10 may also include, for example, separate service brakes (not shown) for applying a braking force to slow or reduce the speed of the work vehicle 10.

Additionally, it should be appreciated that each steering brake 72, 74 may generally correspond to any suitable device(s) for reducing the wheel speeds of its associated wheel 22, 24, such as by converting energy associated with the movement of such wheel 22, 24 into heat. For example, in one embodiment, each steering brake 72, 74 may correspond to a suitable hydraulic cylinder configured to push a stationary frictional element (not shown), such as a brake shoe or brake calipers, against rotating elements (not shown), such as brake drums or brake discs. However, it should be appreciated that the steering brakes 72, 74 may, alternatively, correspond to any other suitable hydraulic, pneumatic, mechanical, and/or electrical components configured to slow or reduce the speed of the associated wheels.

Moreover, in several embodiments, the work vehicle 10 may include various sensors or sensing devices for monitoring or detecting one or more operating parameters of the vehicle 10. For instance, the work vehicle 10 may include one or more steering angle sensors 80 (FIG. 2) configured to detect a parameter associated with the steering angle 60 defined between the steerable wheels 18, 20 and the chassis 12. In one embodiment, the steering angle sensor(s) 80 may be provided in operative association with a respective steering actuator 52 or steering knuckle 54 to provide data associated with the steering angle 60 of one or both of the steerable wheels 18, 20. For example, in such embodiment, the steering angle sensor(s) 80 may be configured as a potentiometer configured to detect relative movement between the steerable wheels 18, 22 and the chassis 12. However, it should be appreciated that, in alternative embodiments, the steering angle sensor(s) 80 may be configured as any other suitable type of sensor. For example, in one embodiment, the work vehicle 10 may include a steering angle sensor(s) 80 configured as an inertial measurement unit so as to detect the lateral acceleration of the work vehicle 10 (e.g., the acceleration perpendicular to the direction of travel 26 of the work vehicle 10), with such lateral acceleration being indicative of the steering angle 60 of the work vehicle 10.

Additionally, the work vehicle 10 may include one or more wheel speed sensors 82, 84 configured to detect a parameter associated with the rotational speed of one or more associated wheels of the work vehicle 10. Specifically, as shown in FIG. 2, a first wheel speed sensor 82 may be provided in operative association with the driven wheel 22 for detecting a parameter associated with the rotational speed of the such wheel 22. Similarly, a second wheel speed sensor 84 may be provided in operative association with the driven wheel 24 for detecting a parameter associated with the rotational speed of such wheel 24. As will be described below, by monitoring the rotational speed of the driven wheels 22, 24, the deceleration or braking rate of each wheel 22, 24 may be determined as the associated steering brake 72, 74 is being activated to reduce the speed of such wheel 22, 24. In one embodiment, the first and second wheel speed sensors 82, 84 may be configured as Hall Effect sensors configured to detect the rotational speeds of the driven wheels 22, 24, respectively. However, it should be appreciated that, in alternative embodiments, the first and second wheel speed sensors 82, 84 may correspond to any other suitable types of sensors. Furthermore, it should be appreciated that, in further embodiments, the work vehicle 10 may include additional wheel speed sensors, such as a wheel speed sensor provided in operative association with each steerable wheel 18, 20.

Moreover, a positioning device(s) 86 (FIG. 1) may also be installed on or within the work vehicle 10. In one embodiment, the positioning device(s) 86 may be configured to determine the exact location of the work vehicle 10 using a satellite navigation position system (e.g. a GPS system, a Galileo positioning system, the Global Navigation satellite system (GLONASS), the BeiDou Satellite Navigation and Positioning system, and/or the like). For instance, the positioning device(s) 86 may be configured to continuously detect successive locations of the work vehicle 10 within the field. As a result, the data from the positioning device(s) 86 may be used to monitor not only the relative position of the work vehicle 10 within the field 10, but also various other movement-related parameters of the work vehicle 10, such as the ground speed and the steering rate of the work vehicle 10.

It should be appreciated that the configuration of the work vehicle 10 described above and shown in FIGS. 1 and 2 is provided only to place the present subject matter in an exemplary field of use. Thus, it should be appreciated that the present subject matter may be readily adaptable to any manner of work vehicle configuration. For example, in an alternative embodiment, the work vehicle 10 may include an articulated chassis to steer the work vehicle 10. Additionally, the work vehicle 10 may also be configured to be operably coupled to any suitable type of work implement, including any drawn implement or any implement configured to be coupled to the vehicle 10 via a three-point hitch.

Figure 3:
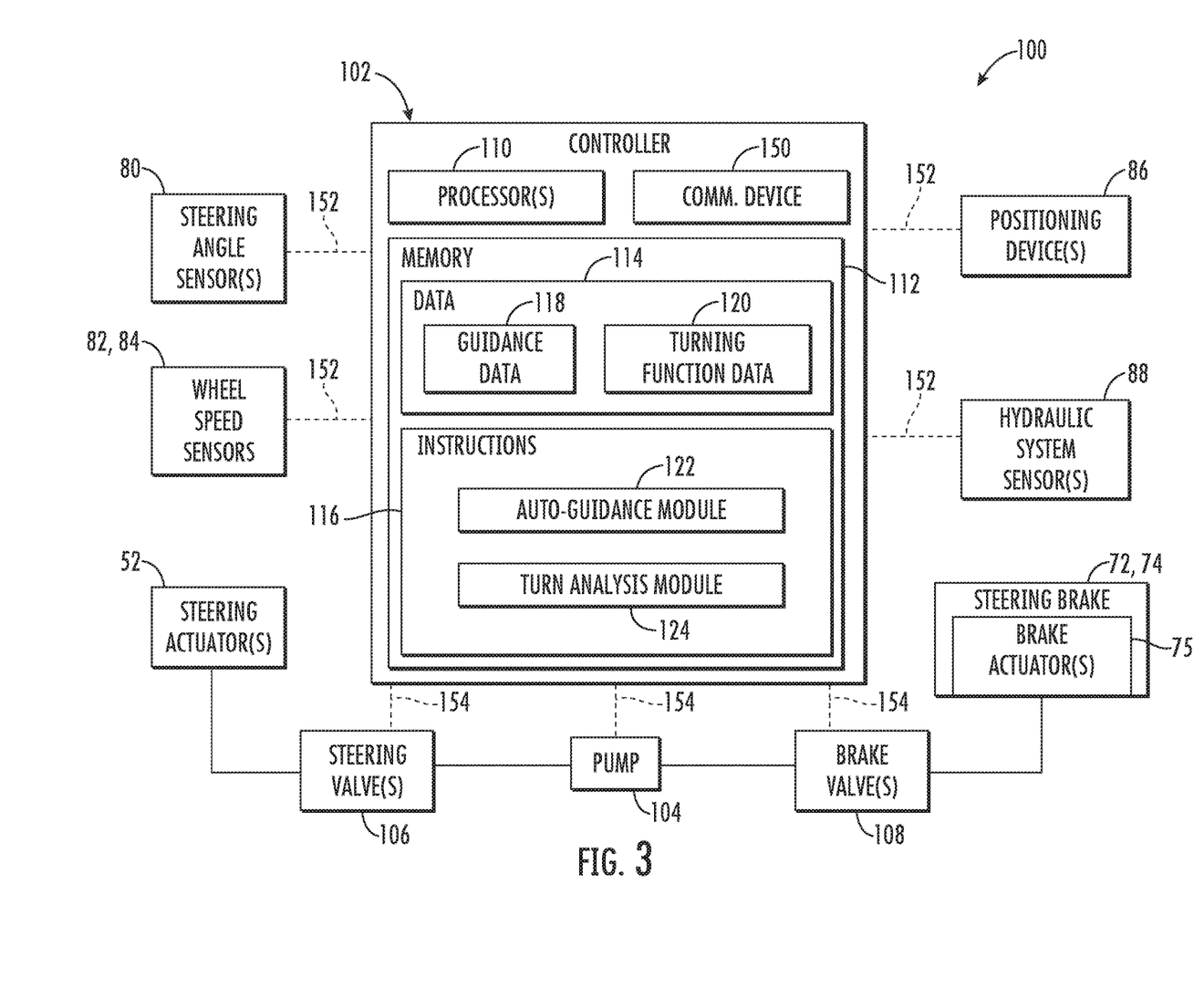
FIG. 3 illustrates a schematic view of one embodiment of a system for executing multi-mode turns within a work vehicle in accordance with aspects of the present subject matter.

Referring now to FIG. 3, a schematic view of one embodiment of a system 10 for executing multi-mode turns or turning operations with a work vehicle is illustrated in accordance with aspects of the present subject matter. In general, the system 100 will be described with reference to the work vehicle 10 shown in FIGS. 1 and 2. However, it should be appreciated that, in other embodiments, the disclosed system 100 may be utilized to execute multi-mode turns or turning operations with any other suitable work vehicle having any other suitable vehicle configuration.

As will be described in greater detail below, the disclosed system 100 allows for multi-mode turns to be executed in which a combination of both steering and braking is used to achieve the desired turn. Specifically, prior to initiating a turning operation, a controller 102 of the disclosed system 100 may be configured to break down the upcoming turn to be executed into two components, namely the amount of correction that can be achieved via control of the vehicle's steering assembly 50 (FIGS. 1 and 2) and the amount of correction that can be achieved via control of the vehicle's braking assembly 70 (FIGS. 1 and 2). By analyzing such components, the controller 102 may be configured to determine the optimal ratio of steering/braking for executing the desired turning operation. Suitable steering and braking commands may then be transmitted by the controller 102 for controlling the operation of the corresponding components of the work vehicle 10. For example, based on the desired steering rate for executing the turning operation, the controller 102 may be configured to transmit steering commands to the steering assembly 50 for controlling the operation of the steering actuator 52 in order to achieve such desired steering rate. Similarly, based on the desired braking rate for executing the turning operation, the controller 102 may be configured to transmit braking commands to the braking assembly 70 for controlling the operation of one of the steering brakes 72, 74 (e.g., the brake associated with the inside wheel) in order to achieve such desired braking rate.

In several embodiments, the steering/braking commands transmitted by the controller 102 may be determined using a predetermined multi-mode turning function, such as a cost function in which various system constraints are input as weighted variables to identify the appropriate steering and braking commands that minimize the function. For example, an instantaneous or current achievable/allowable steering rate and braking rate may be used as inputs into the cost function, such as by inputting the instantaneous or current maximum allowable steering and braking rates into the cost function. In addition, various other system parameters or constraints, such as the ground speed of the work vehicle 10, the maximum allowable braking duration for the steering brakes 72, 74, one or more operating parameters of the vehicle's hydraulic system, an operator-selected aggressiveness setting, and/or an implement-related parameter, may be input as weighted variables into the cost function. By taking into account the relevant variables within the cost function, the optimal control commands for executing the desired turning operation using a combination of both steering and braking can be determined. Moreover, as will be described below, the controller 102 may be configured to continuously update the constraints/parameters input into the cost function, thereby allowing the controller 102 to instantaneously adjust the braking/steering commands during execution of a turning operation to ensure that the vehicle is turned in the most efficient and effective manner.

It should be appreciated that, in several embodiments, the disclosed system 100 may be advantageously utilized during operation within an auto-guidance mode in which the work vehicle 10 is being automatically guided along a predetermined path. In such an embodiment, when the vehicle 10 is approaching a turn along the predetermined path, the controller may be configured to analyze the relevant system constraints/parameters, such as by inputting the constraints/parameters into an associated cost function, to determine the appropriate steering/braking commands for executing the turn. As the turn is being executed, the controller 102 may also update the steering/braking commands, as necessary, based on changing system constraints/parameters (e.g., variations in the current allowable steering rate or braking rate) to allow the system 100 to adapt to varying operating conditions.

As shown in FIG. 3, the system 100 may include various components of the vehicle's hydraulic system for controlling the operation of the steering assembly 50 and/or the braking assembly 70 of the work vehicle 10. Specifically, as shown in the illustrated embodiment, the system 100 includes a pump 104 configured to supply pressurized fluid to the associated actuators of the steering assembly 50 and the braking assembly 70. For example, as indicated above, the steering actuators 52 of the steering assembly 50 may be configured as hydraulic cylinders to allow for selective extension and retraction of the actuators 50 to adjust the steering angle 60 (FIG. 2) of the work vehicle 10. Similarly, as shown in FIG. 3, each steering brake 72, 74 may include an associated brake actuator 75 configured as a hydraulic cylinder to allow the brake 72, 74 to be selectively actuated to vary degrees to adjust the braking rate of the work vehicle 10. Additionally, the system 100 also includes control valves 106, 108 for regulating the supply pressurized hydraulic fluid between the pump 104 and each actuator 52, 75. For instance, as shown in FIG. 3, the system 100 may include one or more steering valves 106 for controlling the supply of pressurized hydraulic fluid to each steering actuator 52. Similarly, the system 100 may include one or more brake valves 108 for controlling the supply of pressurized hydraulic fluid to the brake actuator 75 of each steering brake 72, 75. For instance, the brake valve(s) 108 may allow for the supply of hydraulic fluid to each steering actuator 75 to be independently controlled, thereby permitting independent activation of each steering brake 72, 74. As a result, when a turning operation is being executed, the steering brake 72, 74 associated with the inner traction device (e.g., the inner wheel) may be activated without activating the opposed outer traction device.

Moreover, as indicated above, the system 100 may also include a controller 102 communicatively coupled to one or more of the system components for controlling the operation of such components. For instance, as shown in FIG. 3, the controller 102 is communicatively coupled to the pump 104 and control valves 106, 108 for controlling the operation of the vehicle's steering and braking assemblies 50, 70. As such, the controller 102 may be configured to automatically adjust the steering and braking rates of the work vehicle 10 by regulating supply of pressurized fluid to the steering actuators 52 and the brake actuator 75 of each steering brake 72, 74. In addition, as shown in FIG. 3, the controller 102 may also be communicatively coupled to one or more sensors or sensing devices for monitoring one or more operating parameters of the work vehicle 10, such as by being coupled to the steering angle sensor(s) 80 for monitoring the steering angle of the vehicle 10, the wheel speed sensors 82, 84 for monitoring the rotational speed of the vehicle's wheels, and the positioning device 86 for monitoring the location of the work vehicle 10 and/or any other relevant movement-related parameters. The controller 102 may also be coupled to various other sensors or sensing devices for monitoring one or more other operating parameters of the work vehicle 10, such as one or more hydraulic system sensors 88 for monitoring one or more parameters associated with the vehicle's hydraulic system (e.g., the pressure and/or temperature of the hydraulic fluid being supplied to the vehicle's steering and braking assemblies 50, 70).

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a guidance database 118 for storing data associated with controlling the operation of the work vehicle 10 within an auto-guidance mode. For instance, data associated with predetermined paths or guidance lines along which the work vehicle 10 is to be guided may be stored within the guidance database 118. Such predetermined paths may, in certain instances, include one or more turns incorporated therein during which the travel direction of the work vehicle 10 must be adjusted to maintain the vehicle on the desired path. In addition, data associated with turning sequences at the headlands of a field may also be stored within the guidance database 118.

Moreover, as shown in FIG. 3, the memory 112 may include a multi-mode turning function database 120 for storing data associated with the turning function used to determine the appropriate steering/braking commands for executing a multi-mode turning operation. For instance, as indicated above, the controller 102 may, in several embodiments, be configured to utilize a cost function to determine the optimal steering/braking commands to be used to execute the desired turn. In such an embodiment, data associated with the cost function, including the relationship(s) to be applied between the various inputs into the cost function and/or the weight or cost assigned to each input, may be stored within the turning function database 120. For example, when the maximum allowable steering and braking rates are used as inputs into the cost function, the weight/cost of each of such rates and/or the predetermined relationship to be applied between such rates and any other inputs into the cost function may be stored within the turning function database 120. As indicated above, other constraints/parameters that may also be used as inputs into the cost function and for which data may be stored within the turning function database 120 include, but are not limited to, the ground speed of the work vehicle 10, the maximum allowable braking duration for the steering brakes 72, 74, one or more operating parameters of the vehicle's hydraulic system, an operator-selected aggressiveness setting, an implement-related parameter, and/or the like.

Referring still to FIG. 3, in several embodiments, the instructions 116 stored within the memory 112 of the controller 102 may be executed by the processor(s) 110 to implement an auto-guidance module 122. In general, the auto-guidance module 122 may be configured to execute a control algorithm for automatically guiding the work vehicle 10 along a predetermined path using the location feedback or data provided by the positioning device(s) 86. For instance, the location data provided by the positioning device(s) 86 may allow the controller 102 to monitor the vehicle's position relative to the desired path. The various subs-systems and assemblies of the work vehicle 10 may then be automatically controlled by the controller 102 to maintain the work vehicle 102 on the desired path at the desired ground speed. For instance, the controller 102 may be configured to automatically control the vehicle's engine, transmission, steering assembly, braking assembly, and/or the like to ensure that the travel direction of the work vehicle 10 remains in alignment with the desired path while also maintaining an operator-selected or predetermined ground speed for the work vehicle 10. As is generally understood, the predetermined path for the work vehicle 10 may often correspond to a curved path (or a path with curved sections) that can have varying degrees of curvature (e.g., from a vary gradual turn to a very sharp turn) requiring the vehicle's travel direction to be adjusted as the work vehicle 10 travels along such curved path or curved section. In this regard, the auto-guidance module 122 may, in several embodiments, be configured to automatically control the operation of both the steering assembly 50 and the braking assembly 70 of the work vehicle 10 to allow for the execution of a multi-mode turning operation in order to maintain the vehicle 10 along the desired path.

To allow for the execution of a multi-mode turning operation, the controller 102 may, in several embodiments, include a multi-mode turning function stored within its memory 112 that allows the auto-guidance module 122 to determine control commands to be transmitted to the steering and braking valves 106, 108 for controlling the operation of the associated steering and braking actuators 52, 75, respectively. For instance, as indicated above, the controller 102 may be configured to utilize a cost function to determine the appropriate steering/braking commands. In such an embodiment, various system constraints/parameters may be input into the cost function as weighted variables to facilitate the identification of suitable control commands that minimize the function while allowing the desired multi-mode turning operation to be performed. Thus, the output of the cost function may generally be characterized as steering and braking commands that correspond to the optimal or desired steering and braking rates, respectively, for executing the desired multi-mode turning operation in the most efficient and effective manner.

As indicated above, in several embodiments, an instantaneous or current achievable/allowable steering rate and braking rate may be used as inputs into the cost function. Specifically, in one embodiment, these inputs may take the form of a maximum allowable steering rate and a maximum allowable braking rate for the work vehicle 10, as both rates are significant factors in determining the optimal ratio of steering/braking for executing a multi-mode turning operation. However, it should be appreciated that the maximum allowable steering and braking rates are not static values, but, rather, correspond to variable that can dynamically change based on the operating parameters of the work vehicle 10 and the associated conditions of the field within the vehicle 10 is operating. For instance, while the ground speed of the work vehicle 10 and the maximum steering angle of the steerable wheels can be used to provide a general estimate of the maximum allowable steering rate, other factors, such as one or more operating parameters of the vehicle's hydraulic system (e.g., the current operating pressure and temperature of the hydraulic fluid being supplied to the steering assembly 50), the weight of the work vehicle 10 (and any implements being towed thereby), and the ground conditions of the field (e.g., conditions that contribute to slippage), can result in variations in the maximum allowable steering rate. Similarly, the maximum allowable braking rate can vary as a function of numerous factors, including, but not limited to, the age of the steering brakes 72, 74, one or more operating parameters of the hydraulic system (e.g., the current operating pressure and temperature of the hydraulic fluid being supplied to the braking assembly 70), and the ground conditions of the field (e.g., conditions that contribute to slippage). Thus, the controller 102 may be configured to continuously update these values based on, for example, observed parameters during the execution of a turn to ensure that the inputs into the cost function are adaptive to the changing operating parameters/conditions of the work vehicle 10.

Moreover, as indicated above, various other system parameters or constraints may also be input as weighted variables into the cost function. For instance, the ground speed of the work vehicle 10 (e.g., as monitored via the wheel speed sensors 82, 84 and/or the positioning device(s) 86) and the pressure and/or the temperature of the hydraulic fluid provided via the vehicle's hydraulic system (e.g., as monitored via the hydraulic system sensor(s) 88) may be input into the cost function. In addition, the maximum allowable braking duration for the steering brakes 72, 74 may also be provided as an input into the cost function. This may, for example, correspond to a predetermined value provided by the brake manufacturer. In one embodiment, the cost function may also be adapted to account for an operator-selected aggressiveness setting associated with the execution of turning operations, which may impact the final ratio of steering/braking used to execute a given multi-mode turning operation. For instance, a more aggressive setting may rely more heavily on increased braking to allow for sharper turns to be executed without reducing the ground speed of the work vehicle 10, while a less aggressive setting may rely less on braking and more on ground speed reductions to execute sharper turns. Additionally, an implement-related parameter may, optionally, be input into the cost function that takes into account whether the work vehicle 10 is towing an implement and, if so, whether the implement is being drawn via a draw bar or coupled to the vehicle via a three-point hitch. For instance, implements may increase the overall weight of the work vehicle 10 and, thus, may affect the execution of turning operations. Furthermore, drawn implements may be more susceptible to jack-knifing under certain conditions and, thus, may impact the desired ratio of steering/braking for executing a multi-mode turning operation to a greater degree than implements that are coupled to the vehicle 10 via a three-point hitch.

During operation within the auto-guidance mode, the auto-guidance module 122 may be configured to look-ahead to determine when the work vehicle 10 will encounter a curved path/section requiring the execution of a turning operation and to also determine the required turning radius of such turning operation. By making such determinations in advance of the vehicle 10 encountering such curved path/sections, the controller 102 may utilize the cost function stored within its memory 112 to calculate a desired steering rate and a desired braking rate for initiating the required turning operation, which may then be converted to corresponding steering and braking commands for controlling the relevant components of the steering assembly 50 and the braking assembly 70, respectively. In doing so, the autoguidance module 122 may set or determine initial values for the maximum allowable steering and braking rates to be used as inputs into the cost function. In one embodiment, these initial values may correspond to maximum allowable steering/braking rates that are pre-programmed into the controller's memory 112. Alternatively, the initial values may correspond to dynamically calculated maximum allowable steering/braking rates that are determined based on prior operating data, such data collected during the execution of prior turning operations within the field. Regardless, the initial values for the maximum allowable steering and braking rates are input into the cost function along with the additional relevant system constraints/parameters to determine initial steering/braking commands for initiating the required turning operation. However, upon initiating the turning operation, the performance of the vehicle 10 may be analyzed to determine the effectiveness of the steering and braking assemblies 50, 70 in achieving the desired steering/braking rates. If it is determined that the steering assembly 50 and/or the braking assembly 70 is not achieving the required steering/braking rates and, thus, the vehicle 10 is not being turned as desired, the value(s) for the maximum allowable steering rate and/or braking rate being input into the cost function may be updated to allow new steering/braking commands to be calculated that adjust the ratio of steering/braking to account for any deficiencies in the steering/braking performance given the current operating parameters/conditions of the work vehicle 10.

As shown in FIG. 3, to perform this analysis, the instructions 116 stored within the memory 112 of the controller 102 may be executed by the processor(s) 110 to implement a turn analysis module 124. In general, the turn analysis module 124 may be configured to observe the actual steering/braking performance of the work vehicle 10 and compare such performance to the desired steering/braking rates associated with the steering/braking commands being transmitted by the controller 102. In the event that the actual steering rate and/or braking rate differs from the desired steering rate and/or braking rate, the turn analysis module 124 may be configured to calculate a new or updated maximum allowable steering rate and/or maximum allowable braking rate for use within the cost function. For instance, if the actual steering rate of the work vehicle 10 is less than the desired steering rate, this may be an indication that the current operating parameters/conditions of the work vehicle are reducing the effectiveness of the steering assembly 50 in steering the vehicle 10, thereby requiring a reduction in the maximum allowable steering rate for the work vehicle. Similarly, if the actual braking rate of the work vehicle is less than the desired braking rate, this may be an indication that the current operating parameters/conditions of the work vehicle are reducing the effectiveness of the braking assembly 70 in reducing the wheel speed of the associated inner wheel, thereby requiring a reduction in the maximum allowable braking rate for the work vehicle 10.

Figure 4:
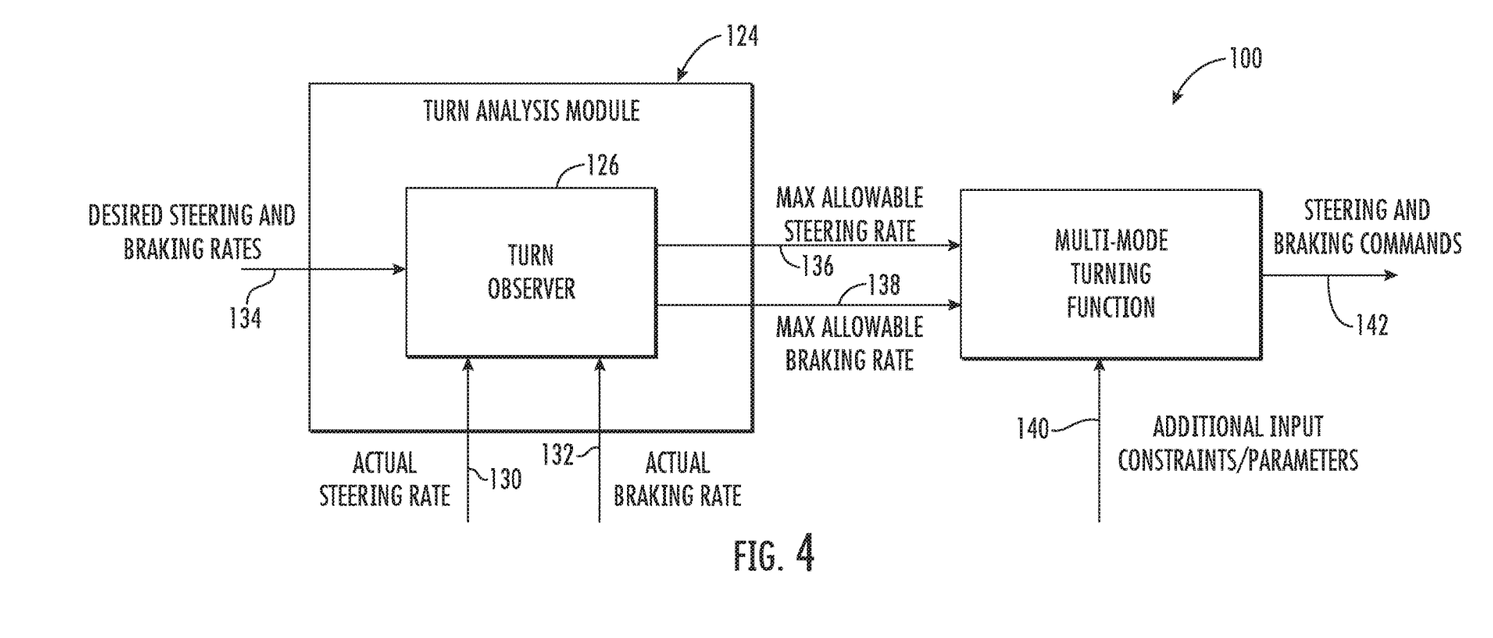
FIG. 4 illustrates a schematic view of one embodiment of a turn analysis module that can be executed by a controller of the disclosed system to observe and analyze the performance of the vehicle's steering and braking assemblies during execution of a multi-mode turn.

As an example, FIG. 4 illustrates a simplified, schematic view of the turn analysis module 124 and the various inputs/outputs associated therewith. As shown, the turn analysis module 124 may include a turn observer 126 that is configured to observe both the actual steering rate (indicated by arrow 130) and the actual braking rate (indicated by arrow 132) for the work vehicle 10 as a turning operation is being executed. For instance, the turn observer 126 may be configured to receive data from the steering angle sensor(s) 80 associated with the actual steering rate of the work vehicle 10, such as by obtaining data associated with the current steering angle 60 (FIG. 2) of the work vehicle. In such instance, by knowing both the current steering angle 60 and the current ground speed of the work vehicle 10, the turn observer 126 may calculate actual steering rate of the work vehicle 10. Moreover, the turn observer 126 may be configured to receive data from the wheel speed sensor(s) 82, 84 associated with the actual braking rate of the work vehicle 10, such as by obtaining data associated with the current declaration rate of the associated wheel. By monitoring the change in wheel speed of the inner wheel during activation of the associated steering brake 72, 74, the effective/actual declaration or braking rate of the wheel may be determined. In addition to using such sensor data or as an alternative thereto, the location data provided via the poisoning device(s) 86 may also be used as an input by the turn observer 126 for determining the actual steering rate and/or the actual braking rate of the work vehicle 10.

By monitoring the actual steering/braking rates, the turn observer 126 may be configured to compare such observed rates to the desired steering/braking rates (indicated by arrow 134) to assess the performance of the steering and braking assemblies 50, 70 during execution of a multi-mode turning operation. As indicated above, in the event that the actual steering rate and/or the actual braking rate falls below the desired steering rate and/or the desired braking rate, respectively, a new or updated maximum allowable steering rate and/or maximum allowable braking rate should be calculated for input into the cost function. For instance, as shown in FIG. 4, based on the comparison between the actual and desired steering/braking rates, the turn observer 126 may be configured to calculate, in real-time, maximum allowable steering and braking rates that take into account, if applicable, any deficiencies in the observed rates. The maximum allowable steering and braking rates output from the turn observer 126 (e.g., as indicated by arrows 136 and 138 in FIG. 4) may then be input into the multi-mode turning function being applied by the controller 102 (e.g., the cost function), along with any additional input constraints/parameters (e.g., as indicated by arrow 140 in FIG. 4) to allow new steering and braking commands (e.g., as indicated by arrow 142 in FIG. 4) to be calculated for completing the required turning operation.

It should be appreciated that turn observer 126 may be configured to calculate new or updated maximum allowable steering/braking rates using any suitable mathematical relationship or function that correlates the observed difference between the actual/desired steering rate or braking rate to the applicable maximum allowable rate. For instance, in one embodiment, the turn observer 126 may be configured to calculate a percent differential between the actual/desired steering rate or braking rate. This calculated percent differential may then be used to reduce the applicable maximum allowable rate, such as by reducing the applicable maximum allowable rate directly by the calculated percent differential or by reducing the applicable maximum allowable rate as a function of such differential. For example, if the actual steering rate is observed to be 10% less than the desired steering rate, the maximum allowable steering rate input into the cost function may be reduced by 10% (or by another percentage determined as a function of the observed percent differential).

Referring back to FIG. 3, the controller 102 may also include a communications interface or device 150 to provide a means for the controller 102 to communicate with any of the various other system components described herein. For instance, one or more communicative links or interfaces 152

(e.g., one or more data buses) may be provided between the communications device 150 and the various system sensors to allow the data transmitted from the sensors to be received by the controller 102. Similarly, one or more communicative links or interfaces 154 (e.g., one or more data buses) may be provided between the communications device 150 and the various electronically-controllable system components to allow the controller 102 to control the operation of and/or otherwise communicate with such system components.

Figure 5:
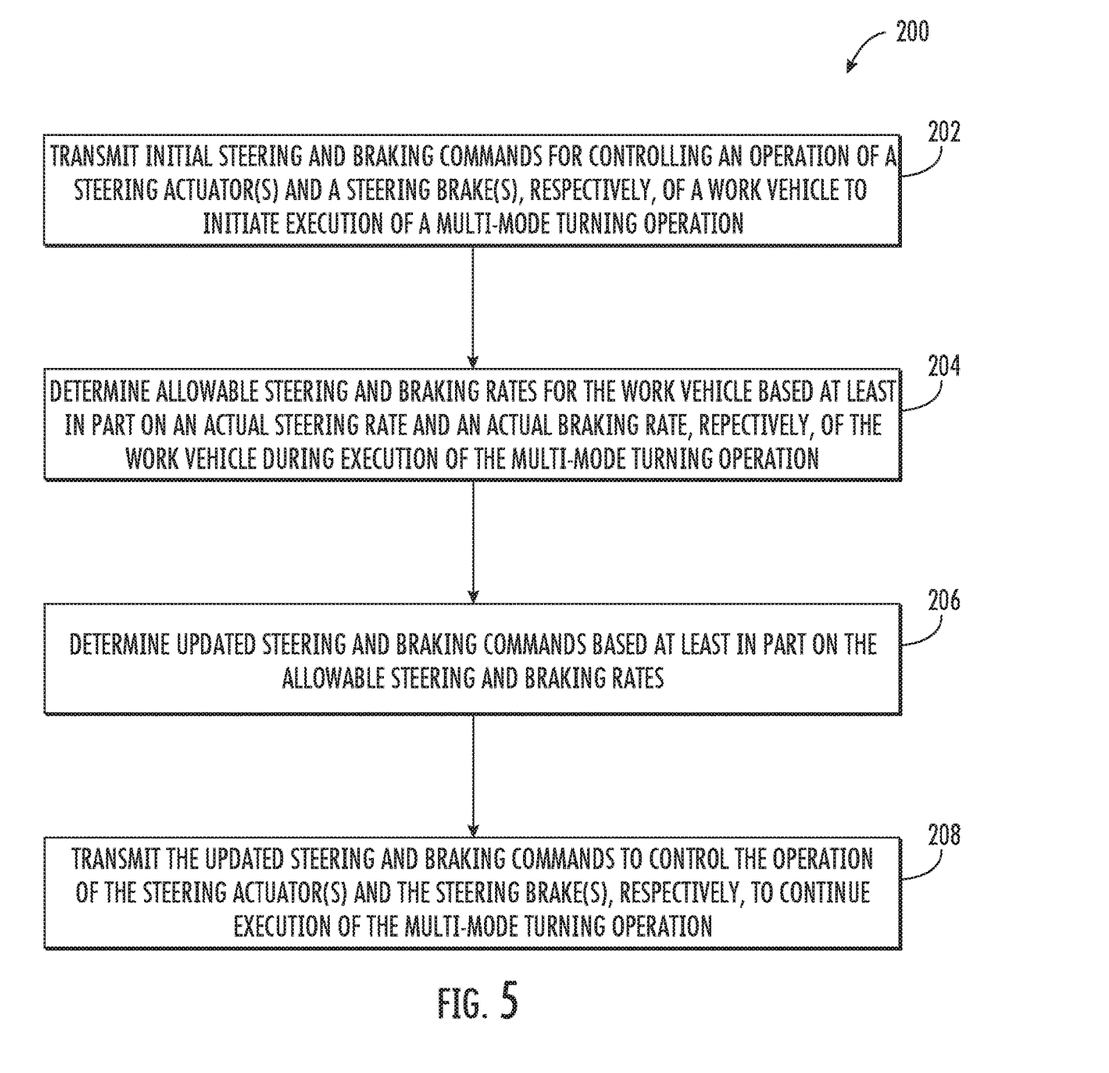
FIG. 5 illustrates a flow diagram of one embodiment of a method for executing multi-mode turns within a work vehicle in accordance with aspects of the present subject matter.

Referring now to FIG. 5, a flow diagram of one embodiment of a method 200 for executing multi-mode turns with a work vehicle is illustrated in accordance with aspects of the present subject matter. In general, the method 200 will be described herein with reference to the work vehicle 10 and the system 100 described above with reference to FIGS. 1-4. However, it should be appreciated by those of ordinary skill in the art that the disclosed method 200 may generally be executed with any work vehicle having any suitable vehicle configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include transmitting initial steering and braking commands for controlling an operation of a steering actuator(s) and a steering brake(s), respectively, of a work vehicle to initiate execution of a multi-mode turning operation. Specifically, as indicated above, prior to the work vehicle 10 executing a given multi-mode turning operation, the controller 102 may be configured to determine initial steering and braking commands for executing the turning operation using a multi-mode turning function stored within its memory 112, with the steering/braking commands being associated with desired steering/braking rates to be achieved during execution of the turning operation. For instance, in several embodiments, the controller 102 may include a cost function stored within its memory 112 that utilizes the maximum allowable steering and braking rates for the work vehicle 10, along with one or more additional system constraints/parameters, to determine initial steering and braking commands. The initial steering and braking commands may then be transmitted to the associated control valves 106, 108 steering and braking assemblies 50, 70, respectively, to control the operation of associated components (e.g., the steering actuator(s) 52 and the steering brake 72, 74 associated with the inside traction device) to initiate the turning operation.

Additionally, at (204), the method 200 may include determining allowable steering and braking rates for the work vehicle based at least in part on an actual steering rate and an actual braking rate, respectively, of the work vehicle during execution of the multi-mode turning operation. For instance, as indicated above, the controller 102 may be configured to observe and analyze the performance of the vehicle's steering and braking assemblies 50, 70 during execution of a multi-mode turning operation, such as by comparing the actual steering/braking rates of the work vehicle 10 to the desired steering/braking rates for executing the multi-mode turning operation. Based on such analysis, the controller 102 may be configured to determine maximum allowable steering and braking rates for the work vehicle 10. For instance, if the actual steering/braking rates are equal to the desired steering/braking rates, respectively, the controller 102 may determine that the values for the maximum allowable steering and braking rates should be maintained as the currently applied values. However, if the actual steering rate or braking rate is less than the desired steering rate or braking rate, respectively, the controller 102 may update the value(s) for the maximum allowable steering rate and/or braking rate to account for such deficiency in the performance of the vehicle's steering and braking assemblies 50, 70.

Moreover, as shown in FIG. 5, at (206), the method 200 may include determining updated steering and braking commands based at least in part on the allowable steering and braking rates. Specifically, as indicated above, the controller 102 may utilize the currently determined values for the maximum allowable steering and braking rates as inputs into a multi-mode turning function (e.g., a cost function) along with one or more additional system constraints/parameters to determine updated steering and braking commands for executing the desired multi-mode turning operation. For instance, upon updating the maximum allowable steering rate and/or braking rate based upon the observed performance of the vehicle's steering and braking assemblies 50, 70, the controller 102 may be configured to calculate new or updated steering and braking commands for controlling the operation of such assemblies 50, 70.

Referring still to FIG. 5, at (208), the method 200 may include transmitting the updated steering and braking commands to control the operation of the steering actuator(s) and the steering brake(s), respectively, to continue execution of the multi-mode turning operation. Specifically, as indicated above, the controller 102 may be configured to transmit the control commands to the associated steering/brake valves 106, 108 to regulate or control the operation of the steering actuator(s) 52 and the appropriate steering brake(s) 72, 74.

It is to be understood that the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for executing multi-mode turns with a work vehicle, the work vehicle including a plurality of traction devices, at least one steering actuator configured to actuate a first pair of traction devices of the plurality of traction devices to adjust a steering angle of the work vehicle, and at least one steering brake configured to selectively brake at least one traction device of the plurality of traction devices, the method comprising:
transmitting, with one or more computing devices, initial steering and braking commands for controlling an operation of the at least one steering actuator and the at least one steering brake, respectively, to initiate execution of a multi-mode turning operation, the initial steering and braking commands being associated with desired steering and braking rates, respectively, for the multi-mode turning operation;
determining, with the one or more computing devices, allowable steering and braking rates for the work vehicle based at least in part on an actual steering rate and an actual braking rate, respectively, of the work vehicle during execution of the multi-mode turning operation;
determining, with the one or more computing devices, updated steering and braking commands based at least in part on the allowable steering and braking rates; and
transmitting, with the one or more computing devices, the updated steering and braking commands to control the operation of the at least one steering actuator and the at least one steering brake, respectively, to continue execution of the multi-mode turning operation.

2. The method of claim 1, further comprising determining the initial steering and braking commands for initiating execution of the multi-mode turning operation based at least in part on a maximum allowable steering rate for the work vehicle and a maximum allowable braking rate for the work vehicle.

3. The method of claim 2, wherein:
determining the allowable steering rate for the work vehicle comprises updating the maximum allowable steering rate for the work vehicle based at least in part on the actual steering rate of the work vehicle during execution of the multi-mode turning operation;
determining the allowable braking rate for the work vehicle comprises updating the maximum allowable braking rate for the work vehicle based at least in part on the actual braking rate for the work vehicle during execution of the multi-mode turning operation; and
determining the updated steering and braking commands comprises determining the updated steering and braking commands based at least in part on the updated maximum allowable steering and braking rates.

4. The method of claim 3, wherein updating the maximum allowable steering rate comprises determining the updated maximum allowable steering rate for the work vehicle based on a comparison between the desired steering rate and the actual steering rate of the work vehicle during execution of the multi-mode turning operation.

5. The method of claim 3, wherein updating the maximum allowable braking rate comprises determining the updated maximum allowable braking rate for the work vehicle based on a comparison between the desired braking rate and the actual braking rate of the work vehicle during execution of the multi-mode turning operation.

6. The method of claim 3, wherein determining the updated steering and braking commands comprises determining the updated steering and braking commands based on the updated maximum allowable steering and braking rates and at least one of a maximum braking duration for the at least one steering brake, a ground speed of the work vehicle, an operator-selected aggressiveness setting, one or more parameters associated with a hydraulic system of the work vehicle, or an implement-related parameter of the work vehicle.

7. The method of claim 2, wherein determining the initial steering and braking commands comprises determining the initial steering and braking commands based on the maximum allowable steering and braking rates for the work vehicle and at least one of a maximum braking duration for the at least one steering brake, a ground speed of the work vehicle, an operator-selected aggressiveness setting, one or more parameters associated with a hydraulic system of the work vehicle, or an implement-related parameter of the work vehicle.

8. The method of claim 1, wherein determining updated steering and braking commands comprises inputting the allowable steering and braking rates as weighted variables into a cost function to determine the updated steering and braking commands.

9. The method of claim 1, wherein the first pair of traction devices comprises a front pair of traction devices coupled to a front axle of the work vehicle and wherein the plurality of traction devices further comprises a second pair of traction devices, the second pair of traction devices comprising a rear pair of traction devices coupled to a rear axle of the work vehicle.

10. The method of claim 9, wherein the at least one steering brake is provided in operative association with an inner traction device of the rear pair of traction devices, with the inner traction device being selected based on a turning direction of the multi-mode turning operation being executed.

11. A system for executing multi-mode turns with a work vehicle, the system comprising:
a plurality of traction devices including a first pair of traction devices and a second pair of traction devices;
a steering assembly including at least one steering actuator configured to actuate the first pair of traction devices to adjust a steering angle of the work vehicle;
a braking assembly including at least one steering brake configured to selectively brake at least one traction device of the plurality of traction devices; and
a controller including at least one processor and associated memory, the memory storing instructions that, when executed by the at least one processor, configure the controller to:
transmit initial steering and braking commands for controlling an operation of the at least one steering actuator and the at least one steering brake, respectively, to initiate execution of a multi-mode turning operation, the initial steering and braking commands being associated with desired steering and braking rates, respectively, for the multi-mode turning operation;

determine allowable steering and braking rates for the work vehicle based at least in part on an actual steering rate and an actual braking rate, respectively, of the work vehicle during execution of the multi-mode turning operation;

determine updated steering and braking commands based at least in part on the allowable steering and braking rates; and transmit the updated steering and braking commands to control the operation of the at least one steering actuator and the at least one steering brake, respectively, to continue execution of the multi-mode turning operation.

12. The system of claim 11, wherein the controller is further configured to determine the initial steering and braking commands for initiating execution of the multi-mode turning operation based at least in part on a maximum allowable steering rate for the work vehicle and a maximum allowable braking rate for the work vehicle.

13. The system of claim 12, wherein the allowable steering rate comprises an updated value for the maximum allowable steering rate for the work vehicle determined by the controller based at least in part on the actual steering rate of the work vehicle during execution of the multi-mode turning operation and the allowable braking rate comprises an updated value for the maximum allowable braking rate for the work vehicle determined by the controller based at least in part on the actual braking rate for the work vehicle during execution of the multi-mode turning operation, wherein the controller is further configured to determine the updated steering and braking commands based at least in part on the updated values for the maximum allowable steering and braking rates.

14. The system of claim 13, wherein the controller is configured to determine the updated value for the maximum allowable steering rate for the work vehicle based on a comparison between the desired steering rate and the actual steering rate of the work vehicle during execution of the multi-mode turning operation.

15. The system of claim 13, wherein the controller is configured to determine the updated value for the maximum allowable braking rate for the work vehicle based on a comparison between the desired braking rate and the actual braking rate of the work vehicle during execution of the multi-mode turning operation.

16. The system of claim 13, wherein the controller is configured to determine the updated steering and braking commands based on the updated values for the maximum allowable steering and braking rates and at least one of a maximum braking duration for the at least one steering brake, a ground speed of the work vehicle, an operator-selected aggressiveness setting, one or more parameters associated with a hydraulic system of the work vehicle, or an implement-related parameter of the work vehicle.

17. The system of claim 12, wherein the controller is configured to determine the initial steering and braking commands based on the maximum allowable steering and braking rates for the work vehicle and at least one of a maximum braking duration for the at least one steering brake, a ground speed of the work vehicle, an operator-selected aggressiveness setting, one or more parameters associated with a hydraulic system of the work vehicle, or an implement-related parameter of the work vehicle.

18. The system of claim 11, wherein the controller is configured to input the allowable steering and braking rates as weighted variables into a cost function to determine the updated steering and braking commands.

19. The system of claim 11, wherein the first pair of traction devices comprises a front pair of traction devices coupled to a front axle of the work vehicle and the second pair of traction devices comprises a rear pair of traction devices coupled to a rear axle of the work vehicle.

20. The system of claim 19, wherein the at least one steering brake is provided in operative association with an inner traction device of the rear pair of traction devices, with the inner traction device being selected based on a turning direction of the multi-mode turning operation being executed.

* * * * *